United States Patent
Cleanthous et al.

(10) Patent No.: US 6,927,511 B2
(45) Date of Patent: Aug. 9, 2005

(54) GENERATOR HAVING DUAL PATH AIRFLOW COOLING ARRANGEMENT AND METHOD THEREFOR

(75) Inventors: Aris C. Cleanthous, Baltimore, MD (US); Michael A. Nelson, Towson, MD (US); Daniel J. White, Baltimore, MD (US)

(73) Assignee: Black & Decker Inc., Newark, DE (US)

( * ) Notice: Subject to any disclaimer, the term of this patent is extended or adjusted under 35 U.S.C. 154(b) by 0 days.

(21) Appl. No.: 10/869,640

(22) Filed: Jun. 16, 2004

(65) Prior Publication Data

US 2004/0256923 A1 Dec. 23, 2004

Related U.S. Application Data

(60) Provisional application No. 60/479,022, filed on Jun. 17, 2003.

(51) Int. Cl.$^7$ .............................................. H02K 9/00
(52) U.S. Cl. .............................. 310/58; 310/53; 310/59
(58) Field of Search ....................... 310/52–53, 58–59, 310/62–63, 60 A, 112, 254

(56) References Cited

U.S. PATENT DOCUMENTS

| | | | |
|---|---|---|---|
| 2,460,752 A | | 12/1949 | Jacobsen |
| 3,538,361 A | | 11/1970 | Hilterbrick et al. |
| 4,246,503 A | | 1/1981 | Fujioka et al. |
| 4,464,594 A | | 8/1984 | Matsumoto et al. |
| 5,561,334 A | | 10/1996 | Ishida et al. |
| 5,838,085 A | * | 11/1998 | Roesel et al. .............. 310/113 |
| 5,861,604 A | * | 1/1999 | McLean et al. .......... 219/130.5 |
| 5,895,994 A | | 4/1999 | Molnar et al. |
| 5,929,611 A | * | 7/1999 | Scott et al. .................. 322/46 |
| 6,011,331 A | | 1/2000 | Gierer et al. |
| 6,285,100 B1 | | 9/2001 | Pflueger et al. |
| 6,320,286 B1 | | 11/2001 | Ramarathnam |
| 6,509,660 B1 | | 1/2003 | Asao |
| 6,784,575 B2 | | 8/2004 | Okuda |
| 2002/0187059 A1 | | 12/2002 | Gold et al. |

FOREIGN PATENT DOCUMENTS

| | | |
|---|---|---|
| DE | 835 476 | 2/1952 |
| DE | 1 011 975 | 7/1957 |
| DE | NR. 1 766 612 | 5/1958 |
| DE | 1 067 518 | 4/1960 |
| DE | 1 087 687 | 8/1960 |
| DE | NR. 1 833 679 | 6/1961 |
| DE | 1 110 740 | 7/1961 |
| DE | 1503 643 | 8/1973 |
| DE | GM 78 03 299 | 5/1978 |
| DE | 29 10 845 A1 | 10/1980 |
| DE | 33 21 251 A1 | 12/1983 |
| DE | G 87 09 364.2 | 12/1988 |
| DE | 39 42 083 A1 | 6/1991 |
| DE | 196 36 723 A1 | 3/1997 |
| EP | 0 412 645 A1 | 2/1991 |
| EP | 0 574 731 B1 | 12/1993 |
| EP | 0 345 896 B1 | 9/1994 |
| EP | 0 794 038 B1 | 9/1997 |

* cited by examiner

*Primary Examiner*—Thanh Lam
(74) *Attorney, Agent, or Firm*—Harness, Dickey & Pierce, P.L.C.

(57) ABSTRACT

A generator incorporating a double sided fan operable to generate dual, spaced apart, simultaneous cooling airflows within the generator to more efficiently cool internal components located on opposite sides of the fan. The double sided fan generates a first cooling airflow into a permanent magnet generator (PMG) assembly and a second cooling airflow through an electronics assembly. The first cooling airflow cools a stator disposed within the PMG assembly, while the second cooling airflow cools a plurality of circuit boards disposed within the electronics assembly. The fan exhausts both cooling airflows radially outwardly.

23 Claims, 4 Drawing Sheets

GENERATOR HAVING DUAL PATH AIRFLOW COOLING ARRANGEMENT AND METHOD THEREFOR

CROSS-REFERENCE TO RELATED APPLICATIONS

This application claims priority from U.S. Ser. No. 60/479,022 filed Jun. 17, 2003, the disclosure of which is incorporated herein by reference.

FIELD OF THE INVENTION

The present invention relates to generators, and more particularly to a portable generator having a pair of cooling airflow paths formed to simultaneously cool a circuit board and a rotor/stator assembly of the generator through the use of a single fan.

BACKGROUND OF THE INVENTION

Generators are used in a wide variety of applications to provide AC or DC power to power electrical tools or implements. In particular, portable generators typically make use of an internal combustion engine which drives a rotor having a plurality of permanent magnets affixed thereto, and where the rotor is coupled to an output shaft of the engine. The rotor is disposed within a stator. Cooperatively these components form a portion of a permanent magnet generator.

Typically one or more electronic circuit boards are disposed adjacent the rotor and stator. Since these components can become quite hot during prolonged use, it is necessary to provide a cooling airflow that not only cools both the rotor and stator, but also the electronic circuit boards that control operation of the generator. Traditionally, this has been accomplished by the use of more than one fan. For example, one fan may be positioned to draw air in through an opening in a housing within which the stator and rotor is disposed, while a separate fan is positioned within a different location in order to draw a cooling airflow around the electronic circuit boards.

Other attempts at addressing the important issue of cooling the internal components of a generator have involved the use of a single fan which generates a main airflow, which is then subsequently divided and channeled into different areas of the generator.

In view of the foregoing, there still exists a need for even more effective cooling of the internal components of a generator. More particularly, there still exists a need for a cooling arrangement which can effectively cool the stator/rotor assembly located within a housing of the generator, as well as the electronic circuit board(s) located remotely from the stator/rotor assembly. It would be particularly desirable to provide an arrangement wherein a single fan disposed strategically within the generator could be used to generate two distinct cooling airflow paths to optimally cool both the rotor/stator assembly as well as an electronics circuit board that is located remotely from the rotor/stator assembly. The use of a single cooling fan that more effectively cools the stator/rotor assembly, as well as the electronic circuit board (s) of the generator would serve to reduce the overall cost of the generator, further improve reliability and simplify the construction of the generator.

SUMMARY OF THE INVENTION

The present invention is directed to a generator which makes use of a single fan to generate a plurality of distinct cooling airflows within interior structure of the generator. The plurality of cooling airflows are used to effectively cool both a rotor/stator assembly of the generator as well as an electronic printed circuit board assembly disposed within the generator but remotely from the rotor/stator assembly.

In one preferred form the generator includes a double sided fan coupled to an output shaft of an internal combustion engine of the generator. The double sided fan is disposed in between a rotor/stator assembly, which is also coupled to the output shaft, and an electronics printed circuit board assembly. A housing of the generator encloses the rotor/stator assembly and has openings at one end thereof through which the double sided fan can draw in a first cooling airflow. The first cooling airflow flows through the stator windings to effectively cool these windings during operation. The double sided fan further is positioned adjacent to an electronic control assembly which houses the electronics printed circuit board assembly components that control operation of the generator. The double sided fan draws a second cooling airflow path in through the electronic control assembly and exhausts it out through an exhaust outlet region together with the first cooling airflow. Accordingly, two distinct cooling airflows are drawn into the generator from different inlet points to simultaneously cool both the rotor/stator assembly and the printed circuit boards within the electronic control assembly. This makes for a very compact, yet effective airflow cooling arrangement that only requires a single fan to implement.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
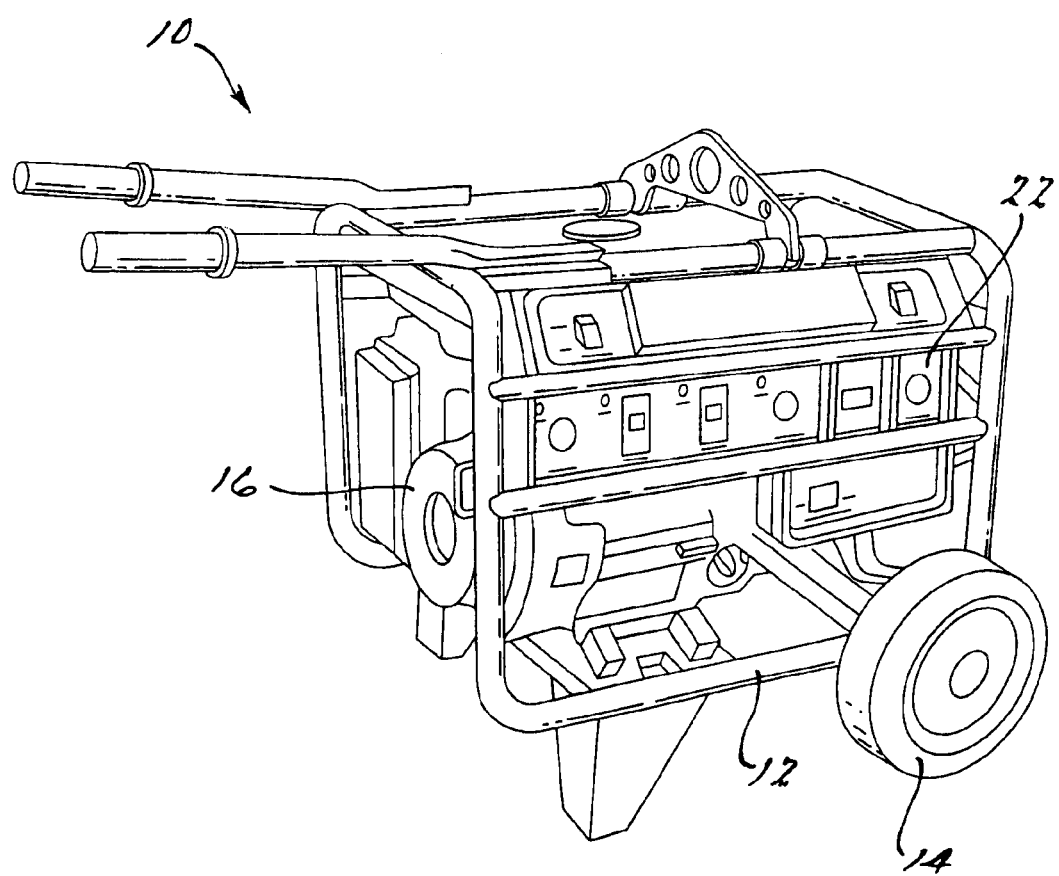
FIG. 1 is a perspective view of a portable generator in accordance with a preferred embodiment of the present invention.
Figure 2:
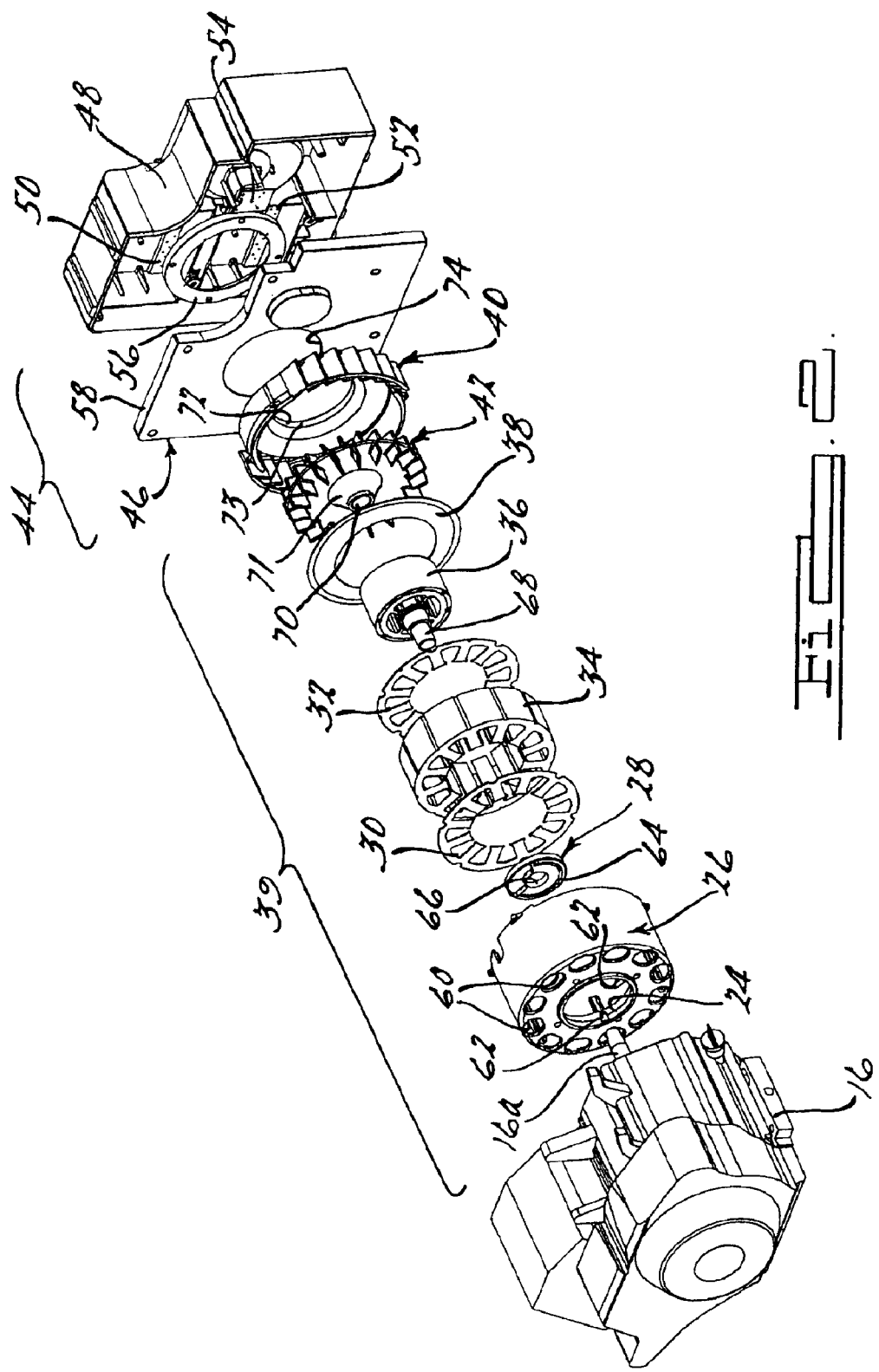
FIG. 2 is an exploded perspective view of certain of the internal components of the generator of FIG. 1.

Referring to FIGS. 1 and 2, a generator 10 in accordance with a preferred embodiment of the present invention is shown. The generator forms a portable generator which is supported on a frame 12 and by at least a pair of wheels 14. The generator 10 comprises an internal combustion (IC) engine 16 which is operatively coupled to a permanent magnet generator (assembly 39 in FIG. 2) and an electronics control assembly 44 (component 44 in FIG. 2), both of which are hidden from view in FIG. 1. A control panel 22 (FIG. 1) is also operatively coupled with the electronics control assembly to enable the user to control operation of the generator and to make use of its generated electrical power.

Referring specifically to FIG. 2, certain components of the generator 10 can be seen in exploded fashion. The internal combustion engine 16 includes an output shaft 16a which extends through an opening 24 in a front end bell 26. The front end bell 26 encloses a position sensor housing 28, a pair of insulating end rings 30 and 32, a stator 34 disposed in between the end rings 30 and 32, a rotor 36 and a fan baffle 38. A back end bell 40 encloses a double sided fan 42. The back end bell is coupled to the electronic control assembly 44. The electronic control assembly 44 is comprised of a cover 46, a box 48, a pair of printed circuit boards 50 and 52, and a battery charger assembly 54. An air cone seal 56 is disposed on an inside surface 58 of cover 46 to provide a seal with the back end bell 40, which will be described in further detail momentarily.

With continued reference to FIG. 2, the front end bell 26 also includes a plurality of circular airflow openings 60 and a pair of tabs 62 which are used to mount the position sensor housing 28 coaxially within the opening 24. Tabs 62 can be secured with external fastening elements (not shown) that extend through an arcuate slot 64 in the sensor housing 28 to enable rotational adjustment of the position of the sensor housing 28.

With further reference to FIG. 2, the stator 34 is supported in conventional fashion within the front end bell 26 and is sandwiched between the insulating end rings 30 and 32. The output shaft 16a of the IC engine 16 extends through a central opening 66 in the sensor housing 28, through the insulating end rings 30, 32 and through the stator 34 into a fitting 68. The fitting 68 is press fit into the rotor 36. The rotor 36 is thus fixedly attached to the output shaft 16a to rotate therewith. Components 26, 28, 30, 32, 34, 36, 38, 40, 42 and 68 form the permanent magnet generator (PMG) assembly 39.

Also attached to the output shaft 16a is the double sided fan 42. The fitting 68 extends through a central opening 70 in a hub 71 of the double sided fan 42 so that the fan can be press fit onto the output shaft 16a. The double sided fan 42 has a diameter just slightly smaller than an internal diameter of the back end bell 40 such that it is able to rotate freely within the back end bell. A flange 72 of the back end bell 40 extends through a central opening 74 in the panel 46 and is engaged around its periphery by the air cone seal 56. The air cone seal 56 may be formed from any suitable, flexible sealing material, but in one preferred form it is comprised of rubber.

Figures 4, 5:
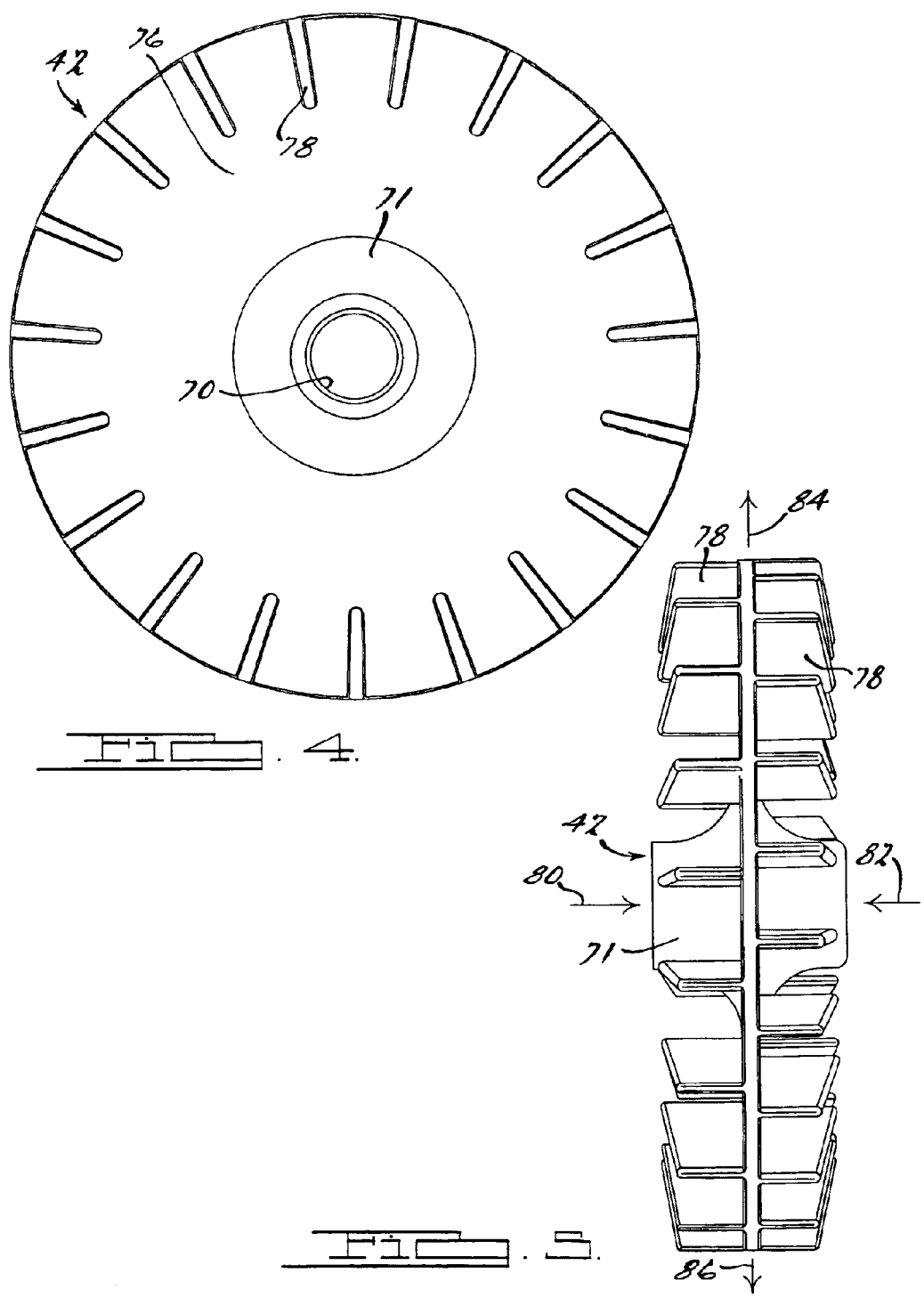
FIG. 4 is a side view of the fan shown in FIG. 3.
FIG. 5 is an end view of the fan of FIG. 4 taken in accordance with directional line 5—5 in FIG. 4.

Referring briefly to FIGS. 4 and 5, the double sided fan 42 can be seen in greater detail. The fan generally comprises a central or base portion 76 having a plurality of orthogonally extending fan blades 78 extending from opposite sides of the base portion 76. Opening 70 is sized to be press fit over a portion of the fitting 68 of the PMG 39. The blades 78 serve to draw air towards the fan in the direction of arrows 80 and 82 in FIG. 5 and then radially away from the fan in accordance with arrows 84 and 86 in FIG. 5. The fan 42 may be made from a variety of materials but is preferably formed from high strength plastic, steel or aluminum. In one preferred form the fan 42 comprises a total of 38 independent fan blades 78 spaced evenly, circumferentially about its periphery, and has a diameter of about 7.9 inches (200 mm). However, it will be appreciated that this dimension and the number, as well as the shape, of the blades 78 could vary considerably depending on the cooling airflow requirements needing to be met.

Figure 3:
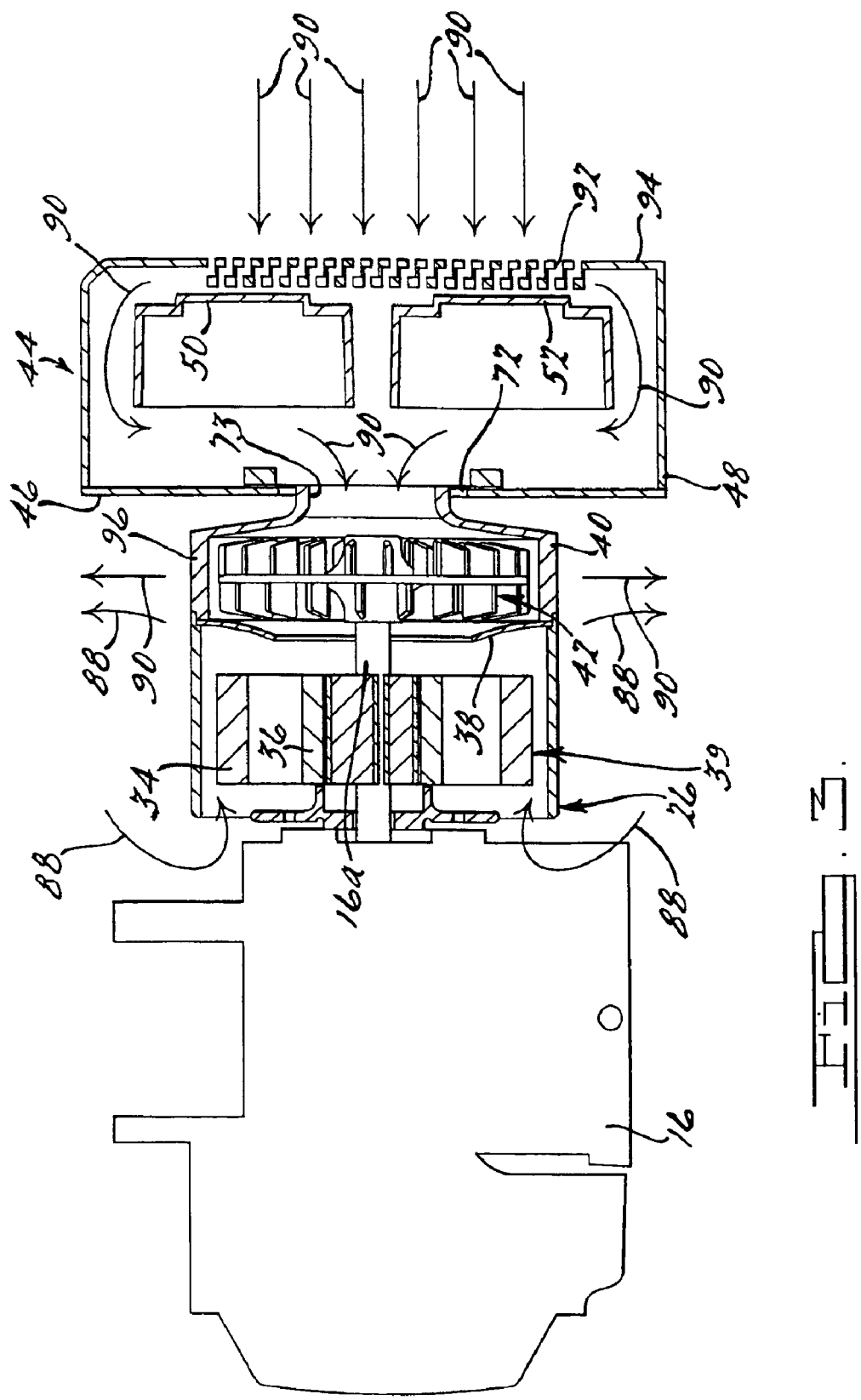
FIG. 3 is a simplified partial side cross sectional view of the components of FIG. 2 shown in assembled relationship illustrating the dual cooling airflows generated by a double sided fan of the generator.

Referring to FIG. 3, there is shown a simplified cross sectional view of the components comprising the IC engine 16, the PMG assembly 39 and the electronics assembly 44. In operation, the output shaft 16a drives the fan 42 rotationally which causes the fan to induce a pair of airflows 88 and 90. Airflows 88 enter an interior area of the PMG 39, and more specifically through the openings 60 in the front end bell 26. Airflows 90 enter the electronics assembly 44 through openings or slots 92 formed in an end wall 94 of the cover 48.

Airflows 88 flow inbetween the stator and the front end bell 26, to thus help cool the stator 34 windings. The seal created by end bell 26 and the stator 34 around the inner diameter of the stator prevents air flows 88 from entering the gap between stator 34 and rotor 36. Airflows 90 flow around circuit boards 50 and 52, out through the opening 74 in the panel 46, and into the back end bell 40 through opening 73. Both airflows 90 and 88 are then directed radially outwardly by the fan 42 out through openings 96 in the back end bell 40. Accordingly, the single double sided fan 42 is used to create separate cooling airflows from spaced apart locations to more effectively cool the various internal components of the PMG 39 and the electronics assembly 44. The use of only a single fan 42 saves appreciable space within the generator 10, simplifies its construction and reduces its overall cost and complexity.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A generator apparatus comprising:
    a generator having a housing with first and third pluralities of longitudinally spaced apart openings formed therein;
    a stator at least partially enclosed within the housing;
    a rotor at least partially disposed within the stator;
    an engine having an output shaft in communication with the rotor for driving the rotor rotationally relative to the stator;
    a fan operatively associated with the rotor to rotate therewith,
    an electronics assembly disposed adjacent said rotor;
    a cover for enclosing said electronics assembly, said cover having a second plurality of openings formed therein; and
    wherein rotation of said fan operates to draw a first cooling airflow in through said first plurality of openings in said housing and around said stator, and a second cooling airflow in through said second plurality of openings and around said electronics assembly, and to exhaust said first and second cooling airflows through said third plurality of openings in said housing.

2. The apparatus of claim 1, wherein said rotor and said electronics assembly are disposed on opposite sides of said fan.

3. The apparatus of claim 1, wherein said fan is disposed longitudinally in line with said rotor.

4. The apparatus of claim 1, wherein said first plurality of openings is disposed adjacent a first side of said fan and said second plurality of openings is disposed adjacent a second side of said fan.

5. The apparatus of claim 1, wherein said fan comprises a double sided fan having a first plurality of blades for generating an airflow in a first longitudinal direction within said housing and around said stator, and a second plurality of blades for generating a second airflow in a longitudinal direction opposite to said first airflow, through said cover.

6. The apparatus of claim 5, wherein said double sided fan directs said first and second airflows radially outwardly through said third openings in said housing.

7. A generator apparatus comprising:
a generator having a housing with having a plurality of openings;
a stator at least partially enclosed within the housing;
a rotor at least partially disposed within the stator;
an engine having an output shaft in communication with the rotor for driving the rotor rotationally relative to the stator;
a double sided fan operatively associated with the rotor to rotate therewith,
an electronics assembly disposed adjacent said rotor;
wherein rotation of said double sided fan operates to draw a first airflow longitudinally through said plurality of openings in said housing and past said stator, and to draw a second cooling airflow around said electronics assembly, assembly, and to exhaust said first and second cooling airflows from an interior area of said generator to an ambient environment.

8. The apparatus of claim 7, further comprising a cover for at least partially enclosing said electronics assembly; and
wherein said cover includes a plurality of openings through which air can be drawn through the cover and over said electronics assembly.

9. The apparatus of claim 8, wherein said openings in said housing and said openings in said cover are disposed on opposite longitudinal sides of said double sided fan.

10. The apparatus of claim 8, wherein said housing comprises an end ball, and wherein said openings in said housing are formed by a circumferential pattern of openings on said end bell.

11. The apparatus of claim 7, wherein said housing comprises a plurality of radially disposed openings through which said first and second airflows are exhausted.

12. A generator apparatus comprising:
an engine having an output shaft:
a stator;
a housing for at least partially enclosing said stator; said housing having a first plurality of openings;
a rotor mounted concentrically relative to said stator and driven by said output shaft of said engine;
an electronics assembly mounted adjacent said stator;
a double sided fan mounted longitudinally in between said stator and said electronics assembly; and
said fan operating to create a first and second cooling airflows flowing in opposite longitudinal directions to simultaneously cool said stator, said rotor and said electronics assembly, before said airflows are exhausted from said housing.

13. The apparatus of claim 12, wherein said stator and said rotor are mounted within an end bell; and
wherein said end bell includes a plurality of openings for enabling said first cooling airflow to be created inside said end bell.

14. The apparatus of claim 12, further comprising a cover for enclosing said electronics assembly, and
said cover including a plurality of openings for enabling said second cooling airflow to be created inside said cover.

15. The apparatus of claim 12, wherein said cooling airflows are simultaneously exhausted out of said generator radially relative to said double sided fan.

16. A generator apparatus comprising:
an engine:
a stator;
a rotor disposed within said stator and driven by said output shaft of said engine;
an electronics assembly for controlling operation of said generator; and
means for generating simultaneous cooling airflows flowing in opposite longitudinal directions from two spaced apart points within the generator for simultaneously cooling said stator, said rotor and said electronics assembly.

17. The apparatus of claim 16, further comprising a housing for enclosing the stator and the rotor; and
wherein said cooling airflows are simultaneously exhausted radially from said housing relative to said rotor.

18. The apparatus of claim 16, further comprising a cover for enclosing said electronics assembly, said cover including a plurality of airflow openings.

19. The apparatus of claim 16, wherein said electronics assembly and said rotor are located on opposite sides of said means for generating simultaneous cooling airflows.

20. A method for cooling a generator, comprising:
supporting a rotor within a stator;
using an engine to drive the rotor;
enclosing the rotor and the stator within a housing having a plurality of first airflow openings;
supporting an electronics assembly at a longitudinally spaced apart location relative to the rotor such that the rotor is located between the engine and the electronics assembly;
from a point longitudinally in between said rotor and said electronics assembly, generating a pair of airflows simultaneously that flow in opposite longitudinal directions toward one another over said rotor and over said electronics assembly; and
exhausting said pair of airflows through second airflow openings within the housing.

21. The method of claim 20, wherein exhausting said airflows through said second airflow openings comprises exhausting said airflows through a plurality of radially arranged openings in said housing.

22. The method of claim 20, wherein generating said airflows comprises generating one airflow through a plurality of openings in a cover enclosing said electronics assembly.

23. The method of claim 20, further comprising combining said airflows within said generator into a single mixed airflow and exhausting said single mixed airflow through said second airflow openings in said housing, wherein said second airflow openings are arranged radially around said housing.

* * * * *